United States Patent
Frederickson et al.

(10) Patent No.: US 9,626,100 B2
(45) Date of Patent: Apr. 18, 2017

(54) DYNAMIC MANAGEMENT OF EDGE INPUTS BY USERS ON A TOUCH DEVICE

(71) Applicant: Microsoft Corporation, Redmond, WA (US)

(72) Inventors: Steven Frederickson, Seattle, WA (US); Christopher Doan, Seattle, WA (US); Alan Stephenson, Bellevue, WA (US); Bret Anderson, Kirkland, WA (US); Michael Seibert, Redmond, WA (US); Robert Jarrett, Seattle, WA (US); Aleksandar Uzelac, Seattle, WA (US); Steven Welch, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 850 days.

(21) Appl. No.: 13/863,069

(22) Filed: Apr. 15, 2013

(65) Prior Publication Data
US 2014/0310661 A1    Oct. 16, 2014

(51) Int. Cl.
*G06F 3/0488* (2013.01)
(52) U.S. Cl.
CPC ............................ *G06F 3/04883* (2013.01)
(58) Field of Classification Search
None
See application file for complete search history.

(56) References Cited

U.S. PATENT DOCUMENTS

| | | | |
|---|---|---|---|
| 8,330,733 B2 | 12/2012 | Petschnigg et al. | |
| 8,411,060 B1* | 4/2013 | Scholler | G06F 3/04883 345/173 |
| 2006/0238517 A1* | 10/2006 | King | G06F 1/1626 345/173 |
| 2009/0174679 A1* | 7/2009 | Westerman | G06F 3/03547 345/173 |
| 2011/0202834 A1* | 8/2011 | Mandryk | G06F 3/04883 715/701 |
| 2011/0209099 A1* | 8/2011 | Hinckley | G06F 3/0483 715/863 |

(Continued)

OTHER PUBLICATIONS

Clifton et al., U.S. Appl. No. 61/643,488 Specification and Figures.*

(Continued)

*Primary Examiner* — Matt Kim
*Assistant Examiner* — Daniel Samwel
(74) *Attorney, Agent, or Firm* — Rainier Patents, P.S.

(57) ABSTRACT

Systems and methods of blocking, ignoring, suspending, or otherwise altering edge-related UI gestures on touch-sensitive computing devices or on non-touch sensitive computing devices having active edge I/O commands in certain situations are disclosed. In one embodiment, a second UI gesture coming from an outside edge may be altered after a first UI gesture from a user using an running application under certain conditions—e.g., if the second UI gesture is made within a certain time period after the first UI gesture, the second UI gesture is made within a certain proximity of the first UI gesture, etc. In another embodiment, a computing device is disclosed that comprises a controller, a display screen and an operating system that alters certain edge-related UI gestures that might be made by an operating system if, e.g., certain conditions are present.

20 Claims, 6 Drawing Sheets

(56) References Cited

U.S. PATENT DOCUMENTS

| | | | |
|---|---|---|---|
| 2012/0023459 A1 | 1/2012 | Westerman | |
| 2012/0092277 A1* | 4/2012 | Momchilov | G06F 3/038 345/173 |
| 2012/0293440 A1 | 11/2012 | Hotelling et al. | |
| 2013/0002567 A1* | 1/2013 | Lee | G06F 3/04883 345/173 |
| 2013/0069903 A1 | 3/2013 | Geiger | |
| 2013/0293510 A1* | 11/2013 | Clifton | G06F 3/044 345/174 |
| 2014/0189608 A1* | 7/2014 | Shuttleworth | G06F 3/0484 715/863 |

OTHER PUBLICATIONS

Shuttleworth et al., U.S. Appl. No. 61/788,842 Specification and Figures.*
"International Search Report & Written Opinion for PCT Patent Application No. PCT/US2013/060769", Mailed Date: Feb. 3, 2014, Filed Date: Sep. 20, 2013, 10 Pages.
PCT/US2013/060769, International Search Report and Written Opinion of the International Searching Authority, Jan. 20, 2014.
Kirk, David, "Disable Black Bezel on Sony Touchscreens", Published on: Mar. 22, 2012, Available at: http://www.tech-recipes.com/rx/22845/disable-black-bezel-on-sony-touchscreens/.
Tkachenko, Sergey, "How to Disable the Edge Panels (Charms Bar and Switcher) in Windows 8", Published on: Aug. 16, 2012, Available at: http://winaero.com/blog/how-to-disable-the-edge-panels-charms-bar-and-switcher-in-windows-8/.
"How to Enable Or Disable Touchpad Gestures in Windows 8", Published on: Oct. 24, 2012, Available at: http://www.intowindows.com/how-to-enable-or-disable-touchpad-gestures-in-windows-8/.
"Is There a method for Disabling Gestures for Windows8", Published on: Sep. 13, 2012, Available at: http://stackoverflow.com/questions/12415886/is-there-a-method-for-disabling-gestures-for-windows8.
Lilley, Stephen, "How to Turn Off the Synaptics EdgeMotion", Published on: Aug. 21, 2012, Available at: http://www.ehow.com/how_7615190_turn-off-synaptics-edgemotion.html.
International Preliminary Report on Patentability mailed Oct. 29, 2015 from PCT Patent Application No. PCT/US2013/060769, 8 pages.
Communication pursuant to Rules 161 (1) and 162 EPC mailed Nov. 25, 2015 from European Patent Application No. 13771314.5, 2 pages.
Response filed Jun. 6, 2016 to the Communication pursuant to Rules 161 (1) and 162 EPC mailed Nov. 25, 2015 from European Patent Application No. 13771314.5, 11 pages.
Voluntary Amendment and Request for Examination filed Aug. 12, 2016 from Japan Patent Application No. 2016-507532, 6 pages.

* cited by examiner

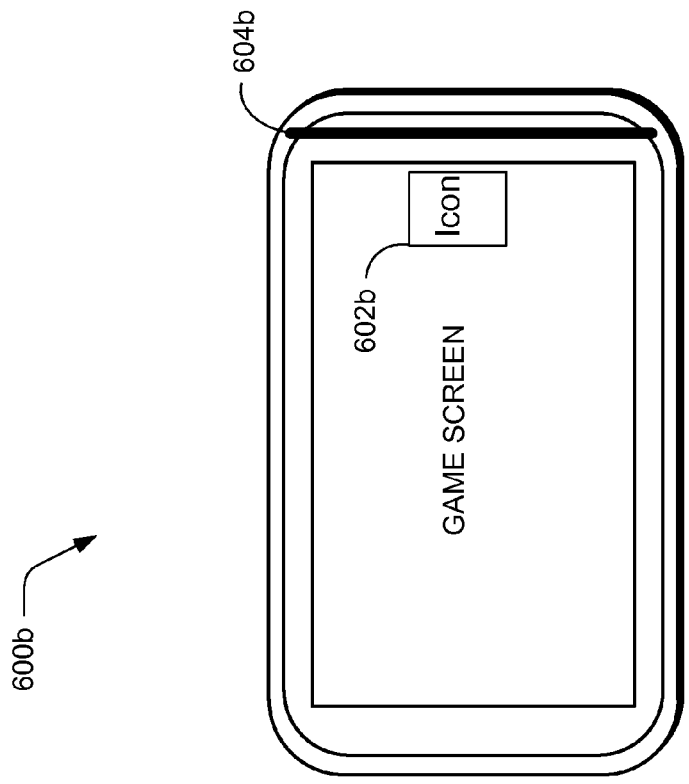
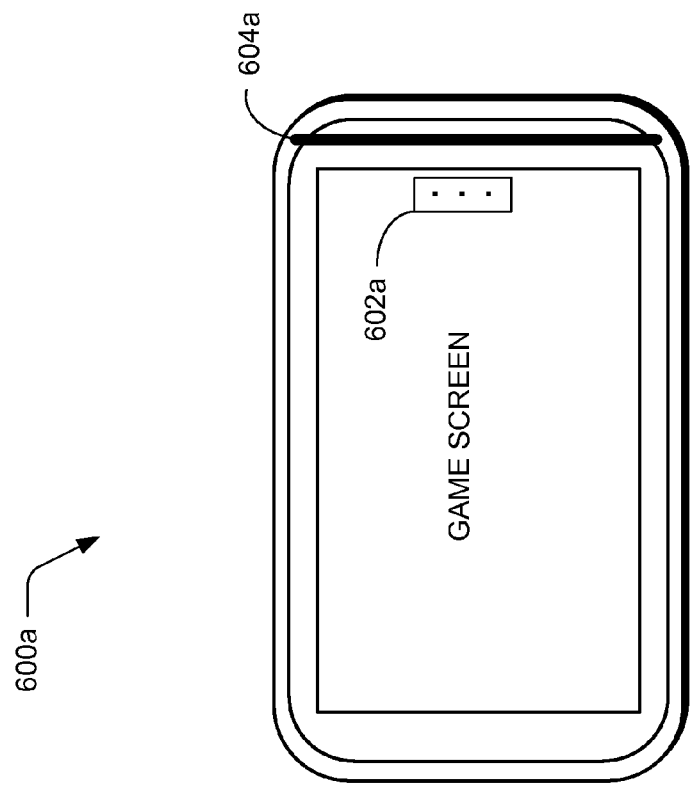
Fig. 6B
Fig. 6A

DYNAMIC MANAGEMENT OF EDGE INPUTS BY USERS ON A TOUCH DEVICE

BACKGROUND

When using computing devices having a display screen (e.g., either a touch sensitive screen or other display screen), a user may on occasion inadvertently perform an I/O gesture near the edge of the screen—when, in fact, the user did not intend to make such a gesture. For example, such a gesture may be panning across the screen to move an image across the screen—and leaving the screen across the edge and then re-entering the display area.

For another example involving a touch-sensitive computing device of such inadvertent edge gesture may occur in something like a painting application. In a painting application, it is possible that a user makes a brush stroke that crosses an edge and the user attempts to come back into the touch sensitive area—expecting the painting application to be active; but, instead, another feature or application may come active as a result of the inadvertent edge gesture. In yet another example, fast panning (e.g., where a user is quickly moving text) may lead to such inadvertent edge gesture as a result of the sloppiness of the interaction.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods of blocking, ignoring, suspending, or otherwise altering edge-related UI gestures on computing devices having a display screen in certain situations are disclosed. In one embodiment, a second UI gesture coming from an outside edge may be altered after a first UI gesture from a user using an running application under certain conditions—e.g., if the second UI gesture is made within a certain time period after the first UI gesture, the second UI gesture is made within a certain proximity of the first UI gesture, etc. In another embodiment, a computing device is disclosed that comprises a controller, a touch screen display and an operating system that alters certain edge-related UI gestures that might be made by an operating system if, e.g., certain conditions are present.

In one embodiment, a method for blocking UI gestures on a computing device, where computing device comprising a display screen, is presented comprising: presenting a UI screen upon said display screen to a user, said UI screen associated with an application that the user is running on said computing device; receiving a first UI gesture from said user, wherein said first UI gesture that starts within the active area of said display screen and crosses a first edge of said display screen; blocking a UI event associated with a second UI gesture, wherein said second UI gesture starts outside of said active display area of said display screen and crosses an edge of said display screen; and wherein said blocking occurs according to set of blocking conditions.

In another embodiment, a computing device is presented, comprising: a controller; a touch screen display, said touch screen display further comprising an active touch screen area and a plurality of touch sensitive edges; an operating system, said operating system capable of executing upon said controller and capable of managing input signals from a user touching said touch screen display and capable of managing output signal to said touch screen display according to signals received from an application running on said computing device; and further wherein said computing device is capable of: presenting a UI screen upon said touch screen to a user, said UI screen associated with an application that the user is running on said computing device; receiving a first UI gesture from said user, wherein said first UI gesture that starts within the active touch area of said touch screen and crosses a first edge of said touch screen; blocking a UI event associated with a second UI gesture, wherein said second UI gesture starts outside of said active touch area of said touch screen and crosses an edge of said touch screen; and wherein said blocking occurs according to set of blocking conditions.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 6A and 6B are several embodiments of a blocked UI gesture that occurs if certain applications may be running in which the first UI gesture is made.

DETAILED DESCRIPTION

Figure 1:
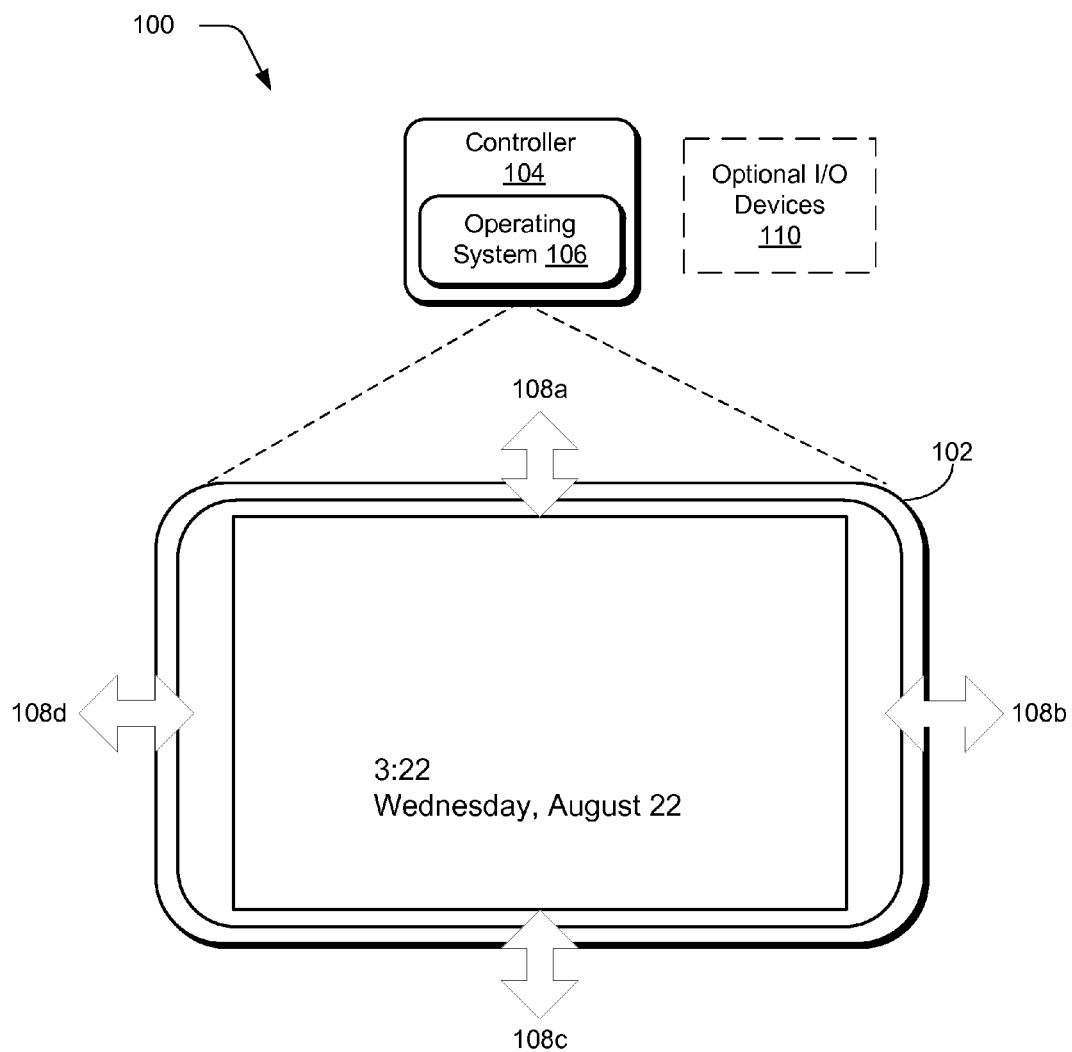
FIG. 1 depicts one embodiment of a computer device/system in made in accordance with the principles of the present application

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

In addition, components, controllers and computing devices may typically include a variety of computer-readable storage devices and/or media. By way of example, and not limitation, computer-readable storage and/or media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by a component, controller or computing device.

Such memory may include computer-storage media in the form of volatile and/or nonvolatile memory. Such memory may be removable, non-removable, or a combination thereof. Exemplary hardware devices include solid-state memory, hard drives, optical-disc drives, etc. Computing devices may include one or more processors that read data from various entities such as memory or I/O modules.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In one embodiment, it may be desirable that the computing device with a touch sensitive screen may automatically disable edge-related gestures and/or input in certain circumstances and/or conditions. Such conditions should desirably correlate to situations where the user was not intending to get system UI but swiped in from the edges anyway. In some embodiment, the computer system may turn off edge input in some circumstances—e.g., when:

(1) the user has just swiped off the edge;
(2) the user is panning; and/or
(3) an app under certain conditions asks the system.

In another embodiment, it may be desirable to that the computing device with a display screen that is not touch sensitive have the computer device identify: (1) an "active" region of the display screen—e.g., where applications running on computing device respond to I/O gestures and/or commands—as well as (2) "edge" regions of the display screen—e.g., where I/O gestures and/or commands are responded to by the operating system or another application (not necessarily the one that the user is running and currently interacting with).

FIG. 1 is one embodiment 100 of an exemplary device 102 as may be employed in association with systems and/or methods of the present application. Device 102 may further comprise a controller 104 that may be executing an operating system 106. In one embodiment, device 102 may also comprise a touch screen—in which various touch and/or swiping gestures may be employed across its edges (e.g., in a number of directions as shown, vertical and/or horizontal directions 108a-d). These edge gestures may invoke various actions by the operating system in response thereto.

For example, in Windows® Version 8 Operating System, a swiping gesture from the right-side 108b into the touch screen may invoke a "charm" list to appear. For another example, a swiping gesture from the left-side 108d into the touch screen may provide a user interface representation of an application in the backstack of the computing device. It should be appreciated that other edge gestures may produce another set of functionality for the operating system of the computing device. It may suffice that the functionality provided by an inadvertent edge gesture is not what the user intended—and therefore, may not be the desired result for the user.

For computing devices that may not have touch sensitive displays (or do have touch sensitive display but use other I/O devices other than a user's touch), optional I/O devices 110 are possible for the computing devices. Such optional I/O devices 110 may include: all gesture based systems, such as but not limiting to: touch sensors with hover, pen sensors, mouse, track pad, touch pad, trackball, Kinect® devices, ultrasound motion sensors, video motion sensors, camera, computer vision sensors/systems, face detection, face gestures, motion capturing, speech recognition, and in general all sensors pertaining to natural input. and any combination thereof. It may suffice that for such computing devices to recognize an active edge region of the display screen that allows I/O gestures and/or commands to be handled by applications other than the one with which the user is currently interacting—e.g., operating system or other applications. Thus, in the present application, where the embodiment discusses situations involving touch-sensitive display interactions with users employing touch gestures and/or swiping, another embodiment is possible with a computing device with a non-touch display (whether or not there is an accompanying touch sensitive display)—but where edge-inputs may be handled as described above.

Various Embodiments

As previously mentioned, there are some embodiments in which edge inputs are ignored, suspended, disabled, blocked or otherwise altered as being interpreted by the computing device as "inadvertent". The following are some situations in which it may be desirable to ignore/disable/block/alter such edge inputs. A computer device may incorporate one, several, or all of the following situations to provide such functionality:

(i) After User Swipes Off Edge

When a user swipes off the edge of the screen, it may be desirable to disable edge input for a desired period of time along the same edge. In addition, it may also be desirable to disable edge inputs that are within a specific distance from where the original swipe went off the screen. Both a time and a distance metric may be used together to provide protection against an inadvertent edge swipe.

For merely one example, this may afford protection in scenarios (e.g., such as a painting app) to work immersively in an environment where all edges of the screen are used for additional functionality without any investment from the developer or interruption to the user. For one exemplary, a user may be drawing a picture on her device, and coloring in the edges of a drawing. While the user may be careful, the user may repeatedly be going off and on the actual active area of the digitizer as the user brushes. With the improved edge UI protection, the system may allow the user to do this without interrupting the user's experience.

Figure 2B:
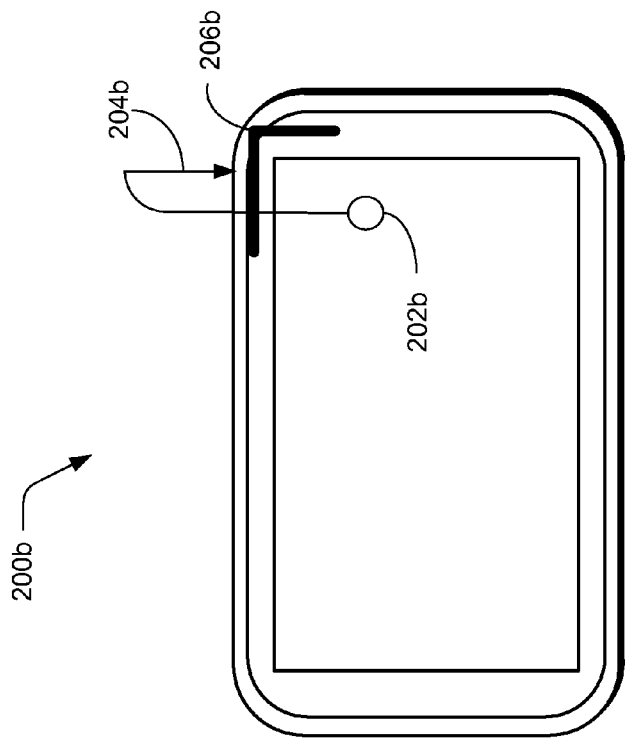
FIGS. 2A and 2B show several embodiments of a blocked UI gesture that occurs within a certain time period after or within a certain proximity of a first UI gesture.
Figure 2A:
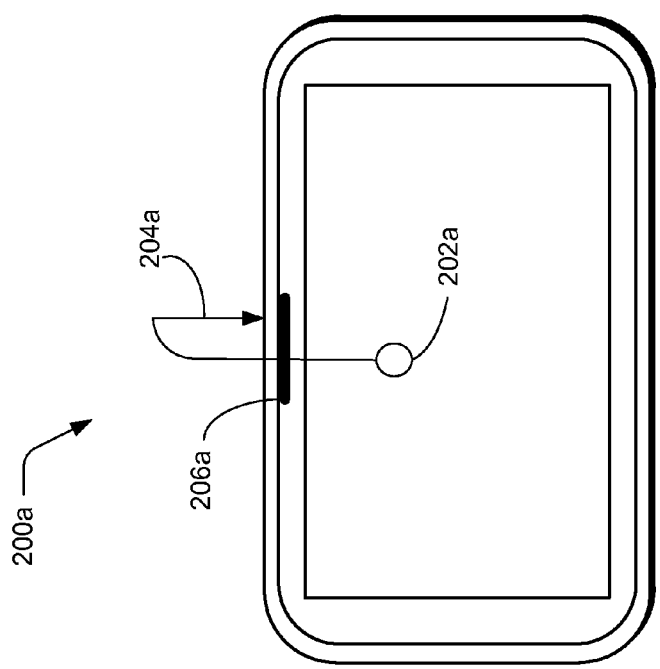

FIG. 2A depicts one such embodiment (200a) of protection against an inadvertent edge swipe/gesture. Swipe 202a may commence within the active area of the touch screen and carried outside the top edge of the computing device. User may then make a swiping gesture 204a back into the active area of the touch screen—e.g., perhaps with the intent to interact with the current application running at the time of the initial swipe 202a (and not meaning to invoke any other edge-triggered UI interaction).

If the return swipe and/or gesture 204a is within either a certain distance (e.g., a few finger widths apart) from the initial outward swipe (e.g., such as depicted by "blocked" (i.e., disabled/ignored/blocked/altered) edge area 206a), then the return swipe will not invoke a different edge-related UI event—e.g., perhaps that is different from an edge-related UI event that is designed into the currently running application.

It should be appreciated that the term "blocked", and other such terms, should also be used to include situations where an edge swipe/gesture would be handled differently (e.g., by the currently running application)—than treated as a gesture for the UI of another application or an operating system (e.g., such gestures might invoke the exhibition of stacked processes, "charms", or issue e.g., other operating system commands or commands from other applications).

In addition, this blocked area 206a may stay blocked and/or suspended until the expiration of a desired period of time. In one embodiment, such a desired period of time may relate to the amount of time a user would reasonably be expected to continue interacting with the application that is currently running—and not, e.g., attempting to invoke other edge-related UI events. Such a desired time period may run from a few hundred milliseconds to a few seconds (and perhaps depending on the nature of the application currently running—e.g., a fast paced game versus a slower paced application).

FIG. 2B is another embodiment (200b) of such protection against an inadvertent edge swipe/gesture. In this case, if the initial touch 202b is sufficiently close to a corner, then the return swipe/gesture 204b may lead to a corner 206b edge boundary which is blocked as described above.

Figure 3:
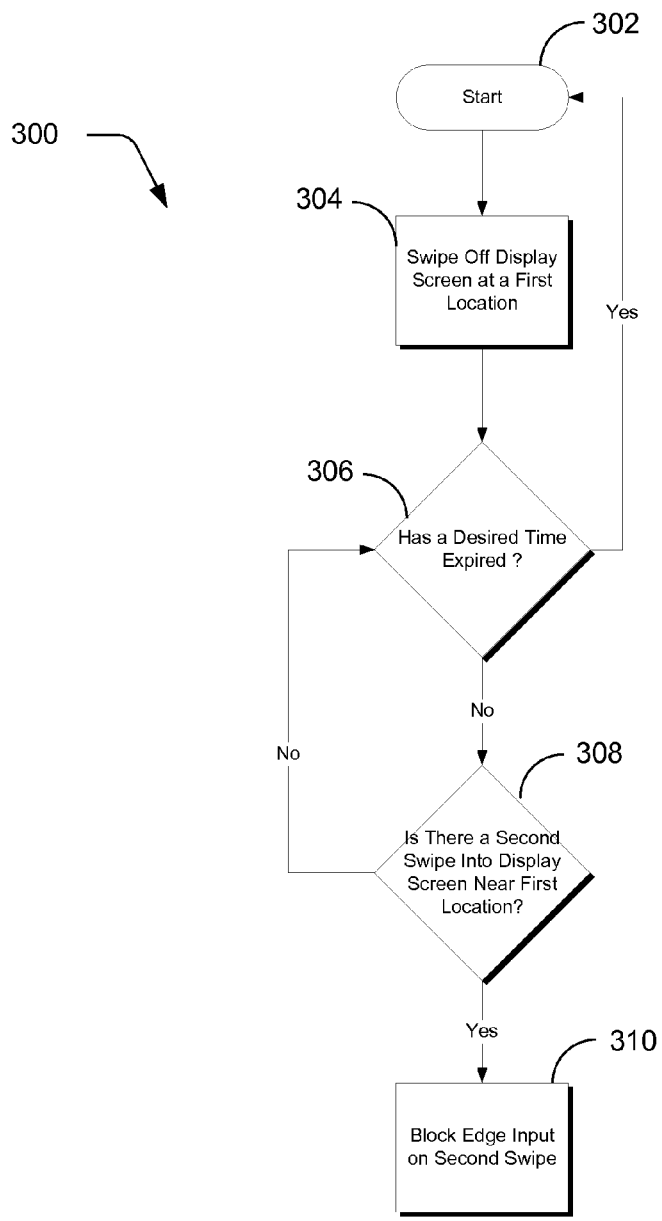
FIG. 3 is one embodiment of a flowchart for a process that may affect the embodiments shown in FIGS. 2A and 2B.

FIG. 3 is merely one embodiment (300) of protecting against inadvertent edge UI interactions by such off screen swipes/gestures. The process 300 may start at 302. At 304, the process may detect a swipe off the touch display active area at a first location. The process may then query whether a desired timer has expired at 306. If it has expired (and without the detection of a second swipe back into the active touch screen area), then the process may return back to 302 and wait for detection of another, first swipe as before.

However, while the time has not expired, a second swipe may be detected at 308. If the second swipe back into the active touch screen from the edge is not within a given distance tolerance as previously discussed, the process may go back to the timer and wait for the timer to expire. In addition, the computing device may allow activation of such edge gestures that are not within the distance tolerance and/or within the time period.

However, if the second swipe/gesture from the edge is within the distance tolerance of the first swipe/gesture (and also within the time period), then the computing device may block or otherwise alter the edge input that such a swipe/gesture might have otherwise allowed. In one embodiment, the process sets the timer and distance info feeds into the edge gesture detection algorithm and allows it to determine whether the swipe/gesture is not an edge gesture (e.g., at a higher system level than the running application). The system may allow the swipe/gesture to go through to the current app (e.g., if such swipe/gesture has meaning in the context of the current app). Such passing through to the app may be an optional feature of the computing device.

It will be appreciated that many variations of this process are possible and possibly desirable (and are encompassed in the scope of the present application). It may suffice that there is some protection against a second swipe/gesture from an edge within a given distance tolerance and/or time tolerance from an initial swipe/gesture from the active touch screen areas that crosses an edge.

(ii) While User is Panning:

In another embodiment, it may be desirable to block/inhibit edge UI effects from a swipe into the active touch screen area—while there is "inertia" happening on the screen. This may tend to happen while the user is panning a screen—e.g., for example, when viewing a slideshow of images, or scrolling through a document that has a portion not fully rendered on screen, or the like. The user may not experience edge input while the screen is in "inertia" mode.

For merely one exemplary, a user may be quickly panning through a really long website. As the user keeps flicking in a desired direction, the user's interactions may start getting sloppier and the user's finger may occasionally hit in the area that would normally invoke edge-related UI event and stop the scrolling. However, with the present system, the panning may be allowed to keep happening, allowing the user's real interaction to continue uninterrupted.

Figure 4:
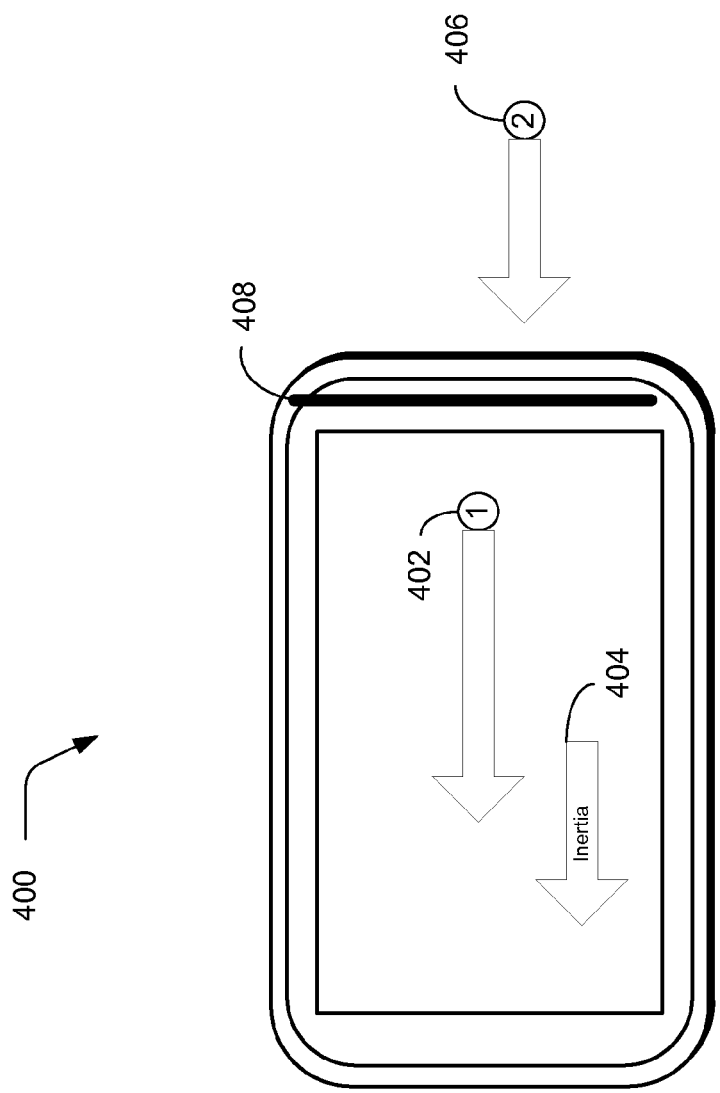
FIG. 4 shows one embodiment of a blocked UI gesture that occurs if there is inertia on a touch screen after a first UI gesture.

FIG. 4 depicts one embodiment (400) of a computer device where the user is panning an image thereon. Swipe/gesture 402 may be implemented—e.g., as a push from the user's finger in certain applications (e.g., photo viewer, word processor, etc.). Such a swipe/gesture may result in the image being giving "inertia" 400—that is, motion that continues past the time of the swipe/gesture. In one embodiment, if inertia is present on the touch screen, then a second swipe/gesture 406—that is perhaps coming from outside of the touch screen area and crossing an edge area—may tend to trigger/initiate an edge-related UI event—e.g., one that would not be expected or desired by the user. This would most likely be the case, if the swipe/gesture was intended to increase the motion and/or inertia of some image object on the screen. In such a case, it may be desirable to block 408 any such initiation of an edge-related UI event—and possibly allow the swipe/gesture to continue the motion in this case.

Figure 5:
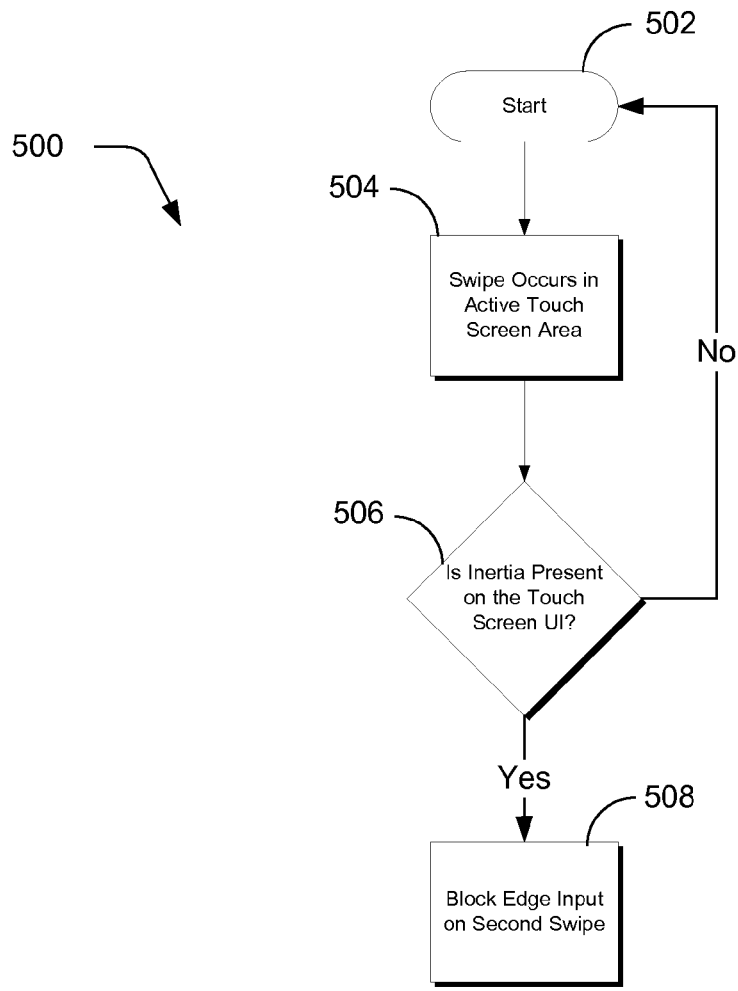
FIG. 5 is one embodiment of a flowchart for a process that may affect the embodiment of FIG. 4.

FIG. 5 is one embodiment (500) of a flowchart that would implement such a procedure. The process may start at 502. At 504, the device may detect a swipe/gesture occurring in the active touch area. The device may inquire at 506 as to whether and inertia is present anywhere on the screen UI. If not, the system may return to processing at 502. Otherwise, the device may block edge input on a second swipe/gesture at 508, if inertia is still present at the time of detecting the second swipe/gesture. Other variations of this process are possible and encompassed under this present application.

In other various embodiments, this heuristic rule may be modified by certain time, distance or other tolerances/metrics, as discussed herein:

(a) Time

A time period may be desired—e.g., be within 'x' seconds of the last inertia start from a known real touch input, possibly with a starting value of approximately 100-500 ms.

In addition, it may be desired to route further interactions to the normal rules if inertia stops before the time completes (for example, if the user or an application stops inertia early then wants to have edge-related UI events).

(b) Directionality—Single Edge

In this case, it may be desired to disable the edge opposite the direction of motion. In other cases, it may be desired to only disable the edge opposite the last interaction, if multiple objects/images are in motion at one time on the screen.

In some cases, if it is hard to tell what the last interaction was, it may be desired to prioritize the edge that will cause application switching as the one to disable (e.g., left edge by default, right edge for RTL languages).

(c) Directionality—Multiple Edges

In some cases, it may be desired to disable both edges only if motion goes away from that edge at a given angle—for example, of at least e.g., 30 degrees.

In some cases, it may be desired to disable both edges based on any inertia component that goes away from that edge.

(d) Zoom/Rotate

In some cases, it may be desired to consider screens where the content has been zoomed, rotated or otherwise altered that the image should be out of scope of the screen. In one case, any behavior for these images should be accepted as long as they fall within the time bounds.

(e) Adjacency

"Rect" (i.e., an app's window on the screen) that is used to justify disabling an edge must be adjacent to that edge. For merely one example, it may be possible to have two apps on the screen at a time—say, in left-right configuration. In such an example, the app on the left may not be able to disable the right edge of the screen.

(f) Compatibility to On-Off-On

In some cases, it may be desired that two sets of logic (e.g., inertia logic and Off-On logic) should work on a single interaction.

(g) Foreground Change

In some cases, it may be desirable that changing the image to a foreground view should not change the logic.

(h) Ability to Selectively Disable Edges (or Disable Them All):

A model where apps can disable 1, 2, 3 or all 4 edges.

Embodiments with Special Applications

In some embodiments, it may be desirable to have some logic/process that operated selectively on whether certain applications are currently running in the foreground. FIGS. 6A and 6B depict two possible embodiments (600a, 600b) when such special applications are in the foreground. For merely one example, such a special applications in question might be gaming applications—or any other application that, e.g., might use fast gestures or other special meaning associated with such swipes/gestures. It is likely the case that (especially in a fast paced game) a swipe by the user crossing an edge may be inadvertent—and that blocking edge input and/or events may be desirable (such as depicted by 604a and 604b).

However, in order to allow the user to have access to edge-related UI events, it may be desirable that certain edge gestures may bring up a small window—having a place holder UI event icons/value (such as, a three-dot pattern 602a—or a small icon 602b representing the possible edge UI event that is possible). If the user desires further access to the edge UI events, the user may thereafter may be allowed to further interact with such place holder values (e.g., further touches/swiping/gestures or the like).

Various Embodiments with a Non-Touch Display

As previously mentioned above, the system, methods and techniques of protecting against inadvertent edge gestures and/or other I/O input are applicable in computing devices that have non-touch displays as well. For example, the computing device in FIG. 1 may have a display screen that recognizes an active area in which the user may (e.g., with optional I/O devices, such as mouse, keyboard, touch pad, etc. and the like) interact with a currently running application in the active area. In addition, computing device may recognize one or more edges of the display screen as allowing edge-related I/O processes—e.g., that may be processed or otherwise handled by an application, possibly other than the current application with which the user is interacting. One such other application may be the operating system that react to such commands and/or gestures—e.g., such gestures might invoke the exhibition of stacked processes, "charms", or issue e.g., other operating system commands or commands from other applications.

For merely one exemplary embodiment (and following the analogous example of FIGS. 2A and 2B for touch-sensitive displays), it may be that a user is applying—e.g. a mouse input at 202a or 202b. If the user swipes the mouse off of the display screen and attempts to bring the mouse back into the active area of the display screen, then the computing device may block any edge-related I/O response, if the return 204a or 204b is within the desired conditions of time and/or proximity metrics. It should be appreciated that other embodiments of computing devices with non-touch displays—similar to FIGS. 3 through 6A and 6B are possible.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method performed on a computing device comprising a touch display screen, the method comprising:
   presenting a user interface (UI) screen upon the touch display screen, the UI screen showing an application that is running on the computing device;
   receiving a first UI gesture that starts within an active display area of the touch display screen, engages the application shown on the UI screen, and crosses a first edge of the touch display screen;
   detecting a second UI gesture that starts outside of the active display area and crosses a second edge of the touch display screen when moving toward the active display area, the second edge forming a corner with the first edge;
   determining whether the second UI gesture that crosses the second edge is within a specified distance tolerance of the first UI gesture that crosses the first edge; and
   responsive to determining that the second UI gesture is within the specified distance tolerance of the first UI gesture, blocking a UI event associated with the second UI gesture.

2. The method of claim 1, wherein the first UI gesture is a drawing gesture.

3. The method of claim 2, wherein the application is a painting application.

4. The method of claim 3, further comprising:
interpreting both the first UI gesture and the second UI gesture as coloring inputs to the painting application.

5. The method of claim 1, wherein the first edge is a horizontal edge and the second edge is a vertical edge.

6. The method of claim 1, further comprising:
responsive to detecting the second UI gesture, determining whether a timer has expired; and
blocking the UI event when the second UI gesture is received before the timer has expired.

7. The method of claim 6, the second UI gesture being blocked in a first instance, the method further comprising:
in a second instance:
before the timer expires, determining that the second UI gesture is not within the specified distance tolerance of the first UI gesture; and
implementing the UI event associated with the second UI gesture.

8. The method of claim 7, wherein the first edge is a horizontal edge and the second edge is a vertical edge to the right of the horizontal edge, forming a 90 degree angle.

9. The method of claim 8, further comprising:
in the second instance, implementing the UI event by passing the UI event to the application.

10. The method of claim 1, wherein the first UI gesture and the second UI gesture are performed by a user's finger.

11. The method of claim 1, further comprising:
blocking the UI event associated with the second UI gesture responsive to a determination that the application is a specific application for which the UI event is blocked.

12. The method of claim 11, wherein the application is a gaming application and the UI event is blocked for a plurality of gaming applications.

13. The method of claim 1, wherein the UI event, when not blocked, invokes operating system functionality.

14. A computing device, comprising:
a controller;
a touch display screen comprising an active area and a plurality of active edges; and
an operating system configured to execute on the controller, manage input signals from user input to the touch display screen, and manage output signals to the touch display screen responsive to an application running on the computing device;
the computing device being configured to:
present a user interface (UI) screen upon the touch display screen, the UI screen being associated with the application that is running on the computing device;
receive a first UI gesture engaging the touch display screen, the first UI gesture starting within the active area of the touch display screen and crossing a first active edge of the touch display screen;
detect a second UI gesture that crosses a second edge of the touch display screen, the second edge forming a corner with the first edge;
determine whether the second UI gesture that crosses the second edge is within a specified distance tolerance of the first UI gesture that crosses the first edge; and
when the second UI gesture is within the specified distance tolerance of the first UI gesture, block a UI event associated with the second UI gesture.

15. The computing device of claim 14, wherein the computing device is further configured to:
before blocking the UI event associated with the second UI gesture, determine whether a timer has expired; and
block the UI event provided the timer has not expired.

16. The computing device of claim 14, the first UI gesture being a touch gesture engaging the application on the touch display screen.

17. The computing device of claim 14, the specified distance being measured from where the first UI gesture left the active area of the touch display screen.

18. The computing device of claim 14, the corner forming a right angle on the touch display screen.

19. A system comprising:
a touch display screen having an active display area;
one or more processors; and
one or more computer-readable storage media storing instructions that, when executed by the one or more processors, cause the one or more processors to:
present a user interface (UI) screen upon the touch display screen, the UI screen being associated with an application running on the system;
detect a first UI gesture that starts within the active display area of the touch display screen and crosses a first active edge of the touch display screen;
detect a second UI gesture that crosses a second active edge of the touch display screen, the second active edge forming a corner with the first active edge;
determine whether the second UI gesture that crosses the second active edge is within a specified distance tolerance of the first UI gesture that crosses the first active edge; and
when the second UI gesture is within the specified distance tolerance of the first UI gesture, block a UI event associated with the second UI gesture.

20. The system of claim 19 wherein the instructions, when executed by the one or more processors, cause the one or more processors to:
determine whether the second UI gesture occurs within a specified time period of the first UI gesture;
block the UI event when the second UI gesture occurs within the specified time period of the first UI gesture; and
perform the UI event when the second UI gesture does not occur within the specified time period of the first UI gesture.

* * * * *